(12) United States Patent
Harres

(10) Patent No.: US 7,639,001 B2
(45) Date of Patent: Dec. 29, 2009

(54) BUILT-IN TEST FOR HIGH SPEED ELECTRICAL NETWORKS

(75) Inventor: Daniel N. Harres, Belleville, IL (US)

(73) Assignee: The Boeing Company, Chicago, IL (US)

(*) Notice: Subject to any disclaimer, the term of this patent is extended or adjusted under 35 U.S.C. 154(b) by 681 days.

(21) Appl. No.: 11/332,979

(22) Filed: Jan. 17, 2006

(65) Prior Publication Data

US 2007/0165680 A1    Jul. 19, 2007

(51) Int. Cl.
*G01R 31/28* (2006.01)
*G01R 31/00* (2006.01)

(52) U.S. Cl. .................... 324/158.1; 324/500

(58) Field of Classification Search ............ 324/642, 324/650, 500, 158.1
See application file for complete search history.

(56) References Cited

U.S. PATENT DOCUMENTS

| | | | |
|---|---|---|---|
| 4,471,494 A | 9/1984 | Keil et al. | |
| 4,607,376 A * | 8/1986 | Sasaki | 375/211 |
| 5,119,679 A | 6/1992 | Frisch | |
| 5,222,166 A | 6/1993 | Weltha | |
| 5,402,433 A | 3/1995 | Stiscia | |
| 5,448,629 A | 9/1995 | Bosch et al. | |
| 5,467,942 A | 11/1995 | Abbas et al. | |
| 5,485,300 A | 1/1996 | Daley | |
| 5,488,621 A | 1/1996 | Slawson et al. | |
| 5,515,361 A | 5/1996 | Li et al. | |
| 5,532,864 A | 7/1996 | Alexander et al. | |
| 5,610,748 A * | 3/1997 | Sakanaka et al. | 398/130 |
| 5,673,132 A | 9/1997 | Carbone, Jr. et al. | |
| 5,809,049 A | 9/1998 | Schaefer et al. | |
| 5,809,220 A | 9/1998 | Morrison et al. | |
| 5,812,572 A | 9/1998 | King et al. | |
| 5,822,099 A | 10/1998 | Takamatsu | |
| 5,903,375 A | 5/1999 | Horiuchi et al. | |
| 5,965,876 A | 10/1999 | Anemogiannis et al. | |
| 6,127,889 A * | 10/2000 | Myer | 330/149 |
| 6,188,498 B1 | 2/2001 | Link et al. | |
| 6,266,169 B1 | 7/2001 | Tomooka et al. | |
| 6,549,310 B1 | 4/2003 | Kuchta et al. | |
| 6,614,236 B1 | 9/2003 | Karam | |

(Continued)

FOREIGN PATENT DOCUMENTS

EP    1 035 679 A2    2/2000

(Continued)

OTHER PUBLICATIONS

Newton, "Novel Approaches to Optical Reflectometry," pp. 320-325, IEEE (1990).

(Continued)

*Primary Examiner*—Amy He
(74) *Attorney, Agent, or Firm*—Rozenblat IP LLC

(57) ABSTRACT

An apparatus for providing auxiliary signals on a high speed electrical signal network is provided such that the auxiliary signals may be used for independent monitoring or communication of monitored information without affecting data or bit error rates for the primary high speed data signals. The auxiliary signals may be used as part of a built-in testing of a network, including electrical time-domain reflectometry measurements to determine fault locations in a network.

17 Claims, 5 Drawing Sheets

U.S. PATENT DOCUMENTS

| | | |
|---|---|---|
| 6,614,512 B1 | 9/2003 | Sakamoto et al. |
| 6,738,436 B1 | 5/2004 | Harres |
| 6,771,361 B2 | 8/2004 | Araki et al. |
| 6,862,397 B2 | 3/2005 | Harres et al. |
| 2003/0108110 A1* | 6/2003 | Harres ........................ 375/259 |
| 2005/0041917 A1 | 2/2005 | Harres |
| 2005/0110979 A1 | 5/2005 | Harres |

FOREIGN PATENT DOCUMENTS

| | | |
|---|---|---|
| JP | 08181656 A | 7/1996 |
| WO | WO-01/86838 A2 | 11/2001 |

OTHER PUBLICATIONS

John G. Proakis, Masoud Salehi, "Analog Signal Transmission and Reception," Communication Systems Engineering, Chapter 5, pp. 320-325 (1994).

* cited by examiner

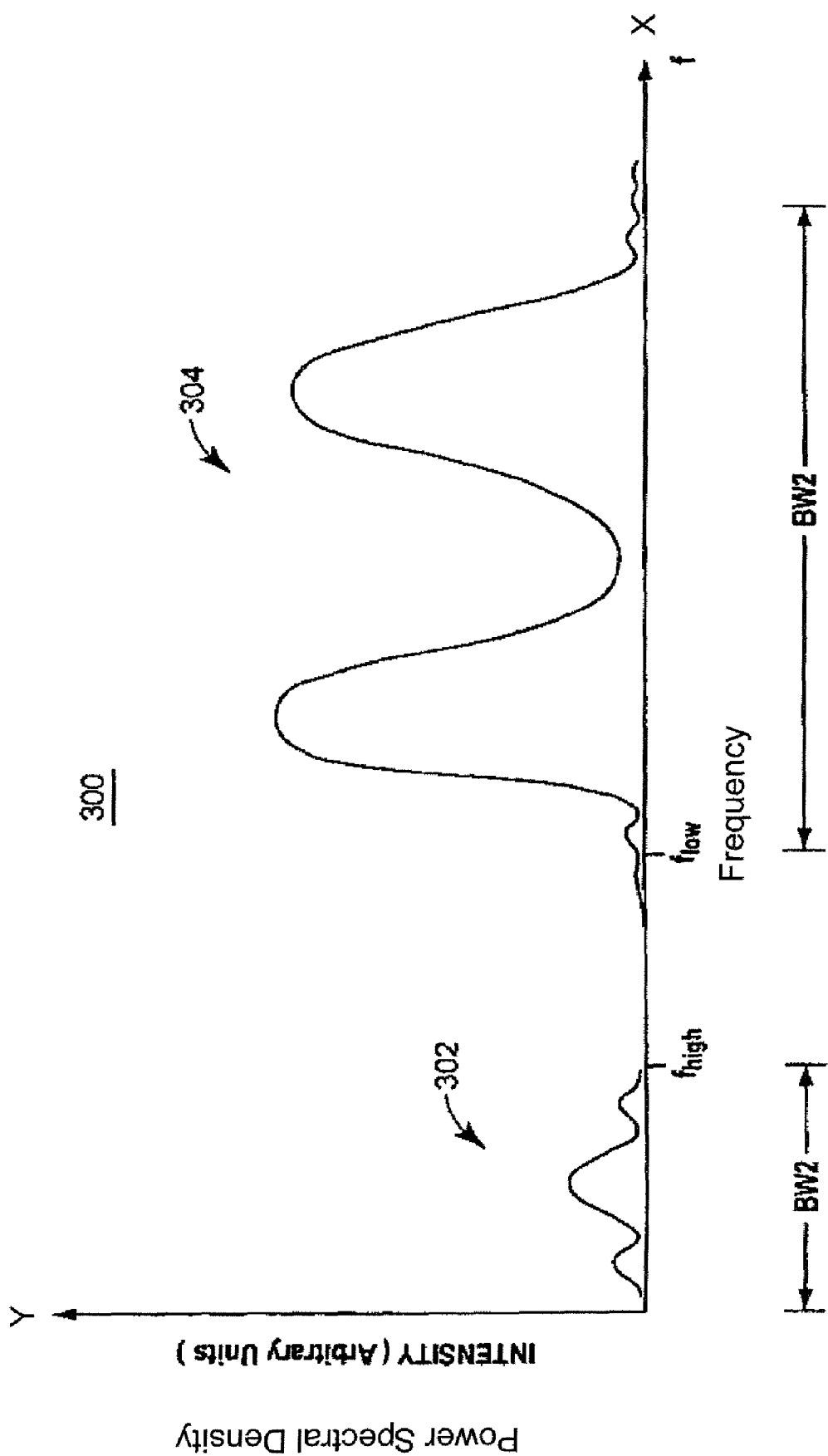

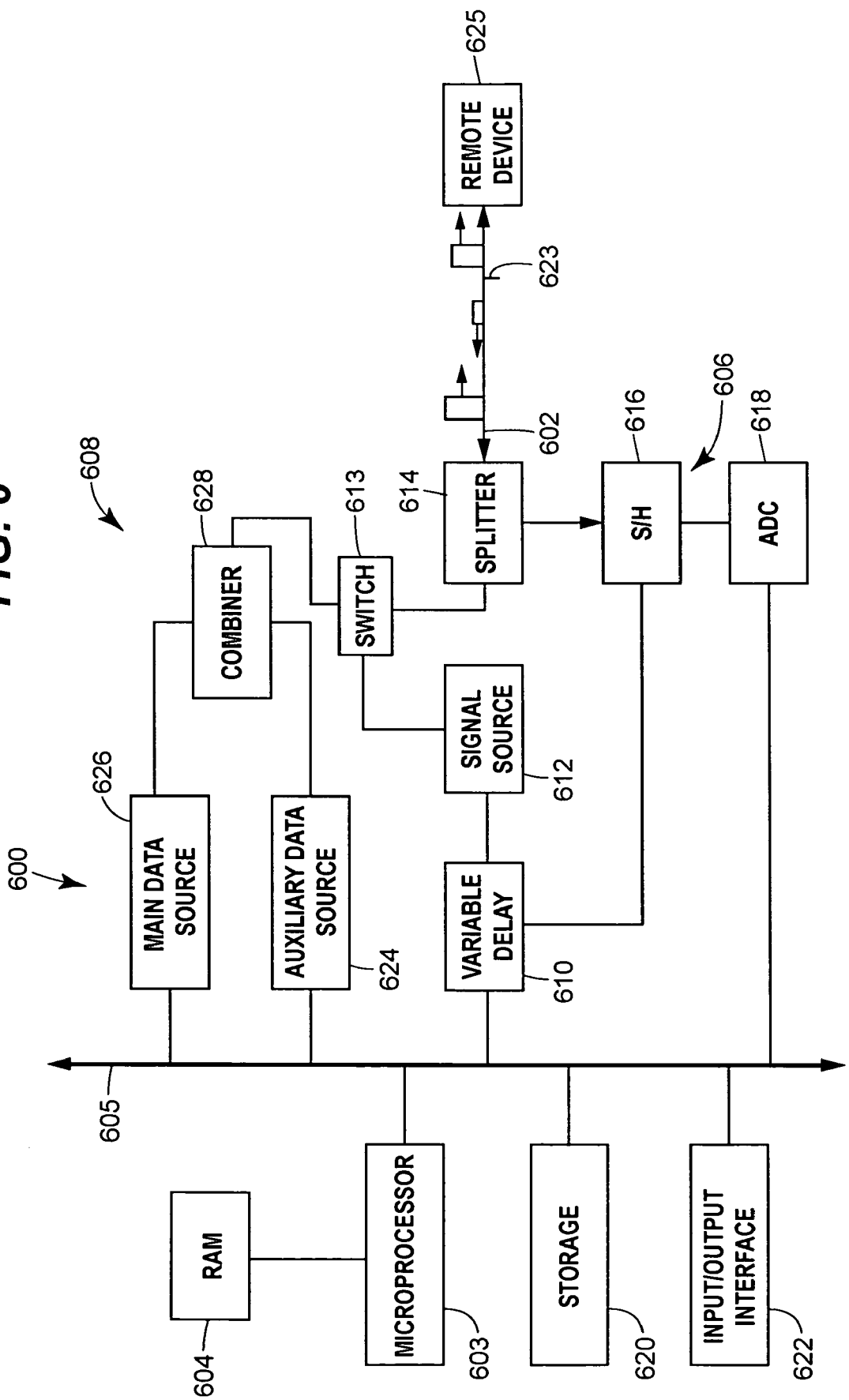

BUILT-IN TEST FOR HIGH SPEED ELECTRICAL NETWORKS

FIELD OF THE INVENTION

The present disclosure relates to apparatuses and techniques for communicating signals on an electrical network and, more particularly, to apparatuses and techniques for communicating diagnostic information.

BACKGROUND OF THE RELATED ART

Although optical networks are being deployed in military and commercial applications with increasing regularity, electrical signal networks are still in wide use, as they can provide low-cost, more robust solutions depending on the application. Plus, although optical networks theoretically offer higher bandwidth, electrical networks are capable of operating over large enough bandwidth regions to satisfy many applications.

As with optical networks, it is desirable in electrical networks to maintain signal integrity throughout the network, which means reducing signal losses at each node, at each device, and on the electrical lines coupled between nodes and devices. To ensure network integrity, designers and maintenance personnel use network analyzing equipment to identify faults in an electrical network. Typically, such analysis requires that technicians physically examine different portions of the network with analyzing equipment until the fault is identified—a time consuming process. To expedite analysis, there is a need for built in testing within network devices, e.g., transceivers, so that devices themselves are able to monitor their operating conditions and/or the operating conditions of other devices on the network. This network self-diagnosis would greatly reduce the time spent by technicians in trying to isolate faults.

Despite the need for built in testing capability, in many applications including aerospace applications, space constraints and costs limit a designer's ability to make devices with proper testing capability. It is therefore desirable to have techniques for obtaining diagnostic information using existing network components and without substantially interfering with the existing network devices or appreciably increasing network size, cost, or complexity.

SUMMARY OF THE INVENTION

In an embodiment provided is an apparatus for providing auxiliary channel communication on an electrical signal-based network, the apparatus comprising: an electrical signal source adapted to provide a high-speed data signal extending over a high frequency range and having a first maximum peak-to-peak value, the signal source adapted to provide an auxiliary data signal extending over a low frequency range below the high frequency range and having a second maximum peak-to-peak value smaller than the first maximum peak-to-peak value, where the second maximum peak-to-peak value is at least two orders of magnitude smaller the first maximum peak-to-peak value; and a controller coupled to the signal source for controlling the signal source to produce the high-speed data signal and for modulating the high-speed data signal with the auxiliary data signal.

Another embodiment provides an apparatus for testing an electrical signal-based network capable of transmitting a high-speed data signal extending over a high frequency range and having a first maximum peak-to-peak value, the apparatus comprising: a transmitter having a signal source adapted to modulate the high-speed data signal with an auxiliary data signal extending over a low frequency range below the high frequency range and having a second maximum peak-to-peak value, where the second maximum peak-to-peak value is at least two orders of magnitude smaller than the first maximum peak-to-peak value, the auxiliary data signal comprising operational data of the transmitter; and an analyzing circuit coupled to receive the modulated high-speed data signal from the signal source and adapted to separately analyze the auxiliary data signal from the modulated high-speed data signal for assessing the operational data.

Yet another embodiment provides an apparatus for performing electrical time-domain reflectometry on an electrical network having a transmission line, the apparatus comprising: an output stage comprising an electrical signal source adapted to provide a high-speed data signal extending over a high frequency range and having a first maximum peak-to-peak value, the signal source adapted to provide an auxiliary data signal extending over a low frequency range below the high frequency range and having a second maximum peak-to-peak value smaller than the first maximum peak-to-peak value, where the second maximum peak-to-peak value is at least two orders of magnitude smaller the first maximum peak-to-peak value, and comprising a controller coupled to the signal source for controlling the signal source to produce the high-speed data signal and for modulating the high-speed data signal with the auxiliary data signal; and a testing stage for sending a test signal on the transmission line and comprising a receiver coupled to receive a reflected portion of the test signal, the receiver comprising, a sample-and-hold device adapted to store the reflected portion, and a variable delay device coupled to the sample-and-hold device for controlling a timing interval of said storage.

Another embodiment provides a method for testing an electrical signal-based network capable of transmitting a high-speed data signal extending over a high frequency range and having a first maximum peak-to-peak value, the method comprising: adapting a signal source to modulate the high-speed data signal with an auxiliary data signal extending over a low frequency range below the high frequency range and having a second maximum peak-to-peak value, where the second maximum peak-to-peak value is at least two orders of magnitude smaller than the first maximum peak-to-peak value, the auxiliary data signal comprising operational data of the transmitter; and providing an analyzing circuit adapted to separately analyze the auxiliary data signal from the modulated high-speed data signal for assessing the operational data.

The features, functions, and advantages can be achieved independently in various embodiments of the present invention or may be combined in yet other embodiments.

BRIEF DESCRIPTION OF THE DRAWINGS

FIG. 3 provides a graph of an example spectral distribution of a high-speed data signal and a lower speed auxiliary data signal as may be combined for communication in the apparatus of FIG. 1.

FIG. 6 illustrates an example built-in test system having a time-domain reflectometry mode and an auxiliary modulated high-speed data signal mode.

DETAILED DESCRIPTION OF AN EXAMPLE

The data signal format in many high-speed networks such as Gigabit Ethernet, Fibre Channel, IEEE-1394b, Infiniband, RapidIO, and others is called 8B10B, binary-level. With the 8B10B format, energy is concentrated at high frequencies, and long run-lengths are prohibited by 8B10B. For example, in some networks virtually no energy will appear below a low frequency threshold, e.g., 10 MHz in an 8B10B format. As a result, it is possible to modulate the high speed data signals with a low-frequency signal that includes operational data of a device or network, such as health information obtained by a diagnostic system or built-in test system. Various examples are described below for transmitting health information data or other auxiliary data as a carrier on a high speed data signal and for removing that health information data from the high speed data signal while maintaining high signal-to-noise ratios and frequency isolation. In some examples, the intensity of the modulating wave may be orders of magnitude smaller than the intensity of the high speed data signal; therefore, the integrity of the high-speed data signal will not be compromised by the modulation. The frequency ranges for modulating waves and the high speed data signal may be set to different, non-overlapping regions in some examples for isolating the signals. Yet, while examples are described below in particular applications, it will be appreciated that the present invention is not limited to the examples described. And it will be appreciated that the examples are provided for explanation purpose, not limitation. Indeed, various modifications, substitutions, and alterations will be appreciated from reading the disclosure.

Figure 1:
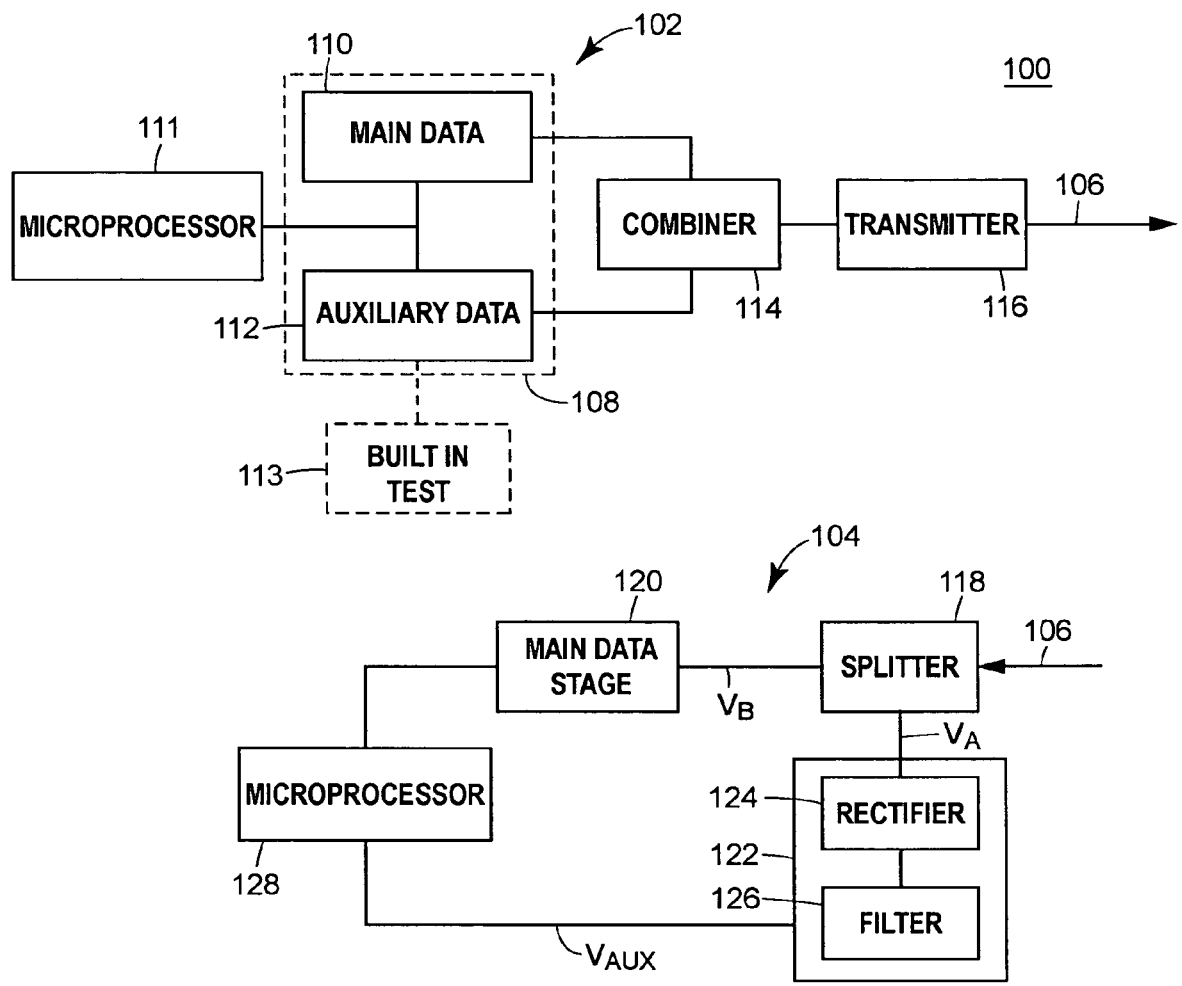
FIG. 1 illustrates an example electrical network providing a transmitter and a receiver capable of communicating high speed data signals and low speed data signals simultaneously.

FIG. 1 illustrates an example network 100 having both a transmitter 102 and a receiver 104, which may represent different devices on an electrical transmission line 106, such as a copper wire. Alternatively, the example network 100 may represent two parts of a single transceiver coupled to the transmission line 106. Example high speed data networks include Gigabit Ethernet, Fibre Channel, IEEE-1394b, and Infiniband, although it will be appreciated that the examples provided herein are not limited to a particular network type, data format, or data transmission rate. In preferred examples, the network 100 transmits high-speed data signals over a particular high frequency bandwidth range leaving unused a complementary low frequency bandwidth that may be used to transmit lower data rate signals, such as auxiliary data, an example of which is the 8B10B signal format.

In the illustrated example, the transmitter 102 includes an electrical signal source 108 that provides a main network data signal source 110 and an auxiliary data signal source 112, where the main data signal may represent high-speed data signals and the auxiliary data signal may represent low speed operational data, such as health information from diagnostic or other built-in test data. The signal sources are controlled by a processor 111. In the illustrated example, an optional built-in tester 113 is shown coupled to the source 108 to provide the auxiliary data for the signal source. By way of example, built-in tests may monitor transmitter power, detector signal current, power supply voltage, power supply current, transmitter temperature, average case temperature, time-domain reflectometry (TDR) measurements or other metrics. An example TDR implementation is illustrated in FIG. 6.

The main and auxiliary data signals are provided to a combining circuit 114 coupled to the signal source 108 for controlling the signal source 108 to produce a combined signal of the main data signal and auxiliary data signal on the transmission line 106. For example, the combining circuit 114 may be a mixer capable of combining the signals by for example modulating the main data signal with the lower speed auxiliary data signal. In the illustrated example, the combining circuit 114 is coupled to an optional transmitter 116 that transmits the combined signal on the transmission line 106, where the transmitter 116 may represent a gain stage with or without additional modulation or signal shaping. It will be appreciated by persons of ordinary skill in the art that although the combining circuit 114, transmitter 116 and the electrical signal source 108 are illustrated as separate elements, these circuit devices may be combined, substituted, or modified as desired.

The receiver 104 is also coupled to the transmission line 106 and in the illustrated example includes a splitter element 118 coupled to a main data signal stage 120 and an auxiliary data stage 122, for example to provide identical 3 dB signals $V_B$ and $V_A$, respectively. The auxiliary data stage 122, includes a rectifier 124 for removing a portion of the voltage of the combined signal originally sent from circuit 114 and for providing that rectified signal to a band-pass filtering/low noise amplifier circuit 126 capable of removing high frequencies from the rectified combined signal including the high-speed data from the main data signal source 110. That is, the auxiliary data stage 122 is capable of removing the modulating auxiliary signal, either in an analog circuit or a digital circuit, in a way in which data transmitted on that signal may be decoded without having the high speed data signal affect the accuracy of that decoding. Although the details of the main data stage 120 are not described, it will be appreciated that this data stage may include similar device elements to those of stage 122, although if the main data signal is a high speed data signal then demodulating/decoding circuitry may be used without needing to pass the signal through a potentially lossy high frequency band pass filter; as the modulating auxiliary wave may be of sufficiently low frequency and sufficiently low intensity so as to be undetected by the demodulating/decoding circuit, and thus leave the high-speed data signal substantially unaffected.

In the illustrated example, the main data signal from the stage 120 and the auxiliary data signal ($V_{AUX}$) from the stage 122 are both provided to a microprocessor 128 that decodes the data (e.g., bit information) contained in each. The processor 128, for example, decodes the auxiliary data signal to determine health information or built-in test data from the transmitter 102, as measured by device 113. In other examples, the auxiliary data signal may contain instructions for the receiver 104 to perform its own built-in test using test equipment coupled to the microprocessor 128 (not shown).

Figure 2:
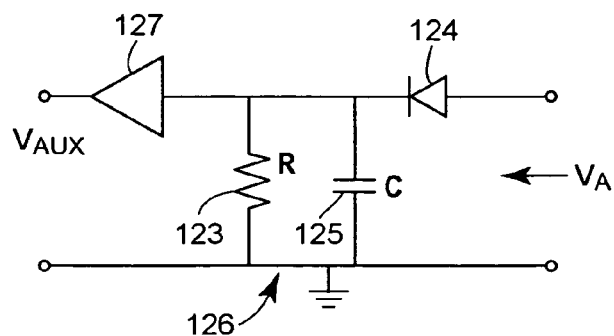
FIG. 2 illustrates an example circuit level implementation of an auxiliary signal recovery stage of FIG. 1.

FIG. 2 illustrates an example implementation of the auxiliary stage 122, in which rectification is achieved by a diode rectifier 124 and filtering by a low frequency bandpass filter 126 comprising a resistor 123 and a capacitor 125. A gain stage amplifier is coupled to the filter and produces the output auxiliary signal, $V_{AUX}$. It will be appreciated that the illustrated stage is an example and that rectification and filtering may be achieved in different ways, with analog or digital circuitry, and in a different order than illustrated.

FIG. 3 is a graph of a spectral distribution 300 of a combined signal from the circuit 114 including an auxiliary, low frequency portion 302 that may represent built-in test data or the health data of the system and including a main data, high-frequency portion 304 that may correspond to the primary signals associated with the main communication function. In the embodiment shown in FIG. 3, the high frequency portion 304 extends over a first bandwidth region, BW1, while the lower frequency portion 302 extends over a second bandwidth region, BW2. The region BW1 has a first low frequency cut off of $f_{low}$, and the region BW2 has a high frequency cut off of $f_{high}$, which is less than $f_{low}$ in the illustrated example. Preferably, $f_{high}$ is one or more orders of magnitude lower than $f_{low}$. In a representative gigabit communications link (e.g. Fibre Channel, Gigabit Ethernet, IEEE 1394b, Infiniband, RapidIO, etc.), the high frequency portion 304 may typically be spectrally shaped by its coding scheme so that its energy is approximately zero at frequencies significantly below a basic modulation rate, e.g., below $f_{low}$. Thus, in one representative embodiment, the high frequency signal 304 of a 1 gigabit-per-second link may have very little energy below 100 MHz and virtually no measurable energy below 10 MHz. Correspondingly, $f_{high}$ may be approximately 1 KHz or four orders of magnitude smaller. These values are provided by way of example, larger and smaller differences in the frequency ranges may be achieved, as well.

On the other hand, the rate at which the low frequency, auxiliary data (e.g., the auxiliary signal 302) typically needs to be exchanged between network devices or points, in order to determine cable loss and other relevant data, may be comparatively modest. For example, a few tens of bytes of information exchanged at a rate of a few times per second may be sufficient to maintain all pertinent information about the health of a link. Thus, a transmission rate for the signal 302 that is substantially lower than the data transmission rate of the signal 304 (e.g. 1 kilobit per second) may be adequate. Such a low-data-rate signal can be low-pass filtered with a simple filter to a desired low-pass limiting frequency (e.g. 10 KHz), resulting in approximately no effect on Bit Error Rate (BER) performance of the 1 kilobit-per-second health link. Such a filtered signal 302 may also have virtually no harmonic energy above a predetermined frequency (e.g. 1 MHz as shown in the embodiment in FIG. 3). Thus, the primary (data) and auxiliary (health) data signals 302, 304 can be transmitted simultaneously on the same channel with approximately no measurable interference.

Figure 4A:
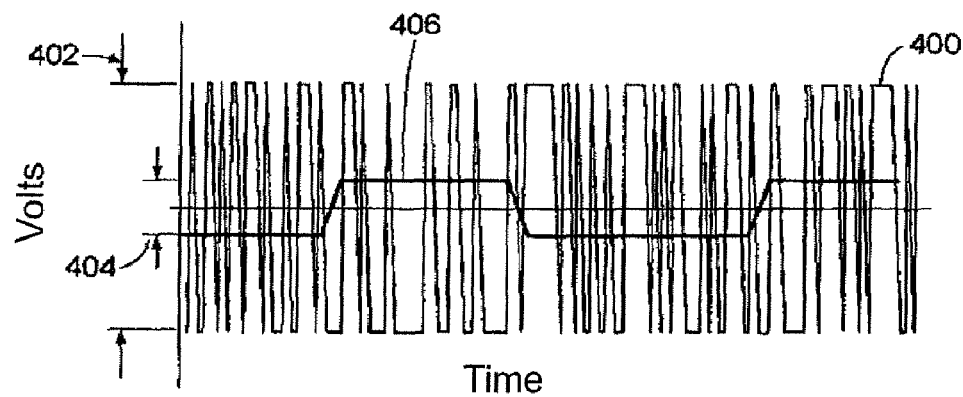
FIGS. 4A and 4B illustrate a high-speed data signal, in the form of a Manchester signal and a lower speed auxiliary data signal and a modulated version of the two, respectively.

FIG. 4A illustrates a high-speed data signal in a Manchester modulated format where each bit of data is represented by at least one bit transition thereby preventing long bitwords of no transition. Manchester encoding may be self-clocking, which means that accurate synchronization of a data stream is possible as each bit is transmitted over a predefined time period. Manchester coding is thus characterized by not having long periods without bit transitions, thus preventing the loss of clock synchronization, or bit errors from low-frequency drift.

The high-speed data signal 400 in the illustrated example has a peak-to-peak voltage value 402 that is substantially larger than a peak-to-peak voltage value 404 of a low frequency auxiliary signal 406 also shown. In preferred examples the peak-to-peak voltage on the auxiliary data signal 406 is substantially smaller than the peak-to-peak voltage value for the main data signal 400 by being at least two orders of magnitude smaller. For example, in typical Fibre Channel or Gigabit Ethernet applications, the peak-to-peak voltage on the high-speed data signal is from 0.5 volts to 2 volts. The peak-to-peak value on the auxiliary data signal, however, may be in the microvolt (μV) range, for example, below 100 μV peak-to-peak for that same Fibre Channel or Gigabit Ethernet application.

In fact, one can determine the theoretical value for the voltage for the auxiliary signal, as follows. A receiver consisting of a 50-ohm termination resistor (R) may produce an RMS noise voltage of:

$$v_N = \sqrt{4kTBR} = \sqrt{4(1.38 \times 10^{-23})(300)(1000)(50)} = 30 \text{ nV}_{RMS} \quad \text{(Eq. 1)}$$

Here, k is Avogadro's number, T is temperature in °K, and B is the bandwidth of the auxiliary signal, BW2, in this instance 1 KHz.

The termination resistor is typically followed by a low-noise amplifier (LNA) which has its own noise that it adds to the signal and which is usually expressed as a Noise Figure (in dB). The Noise Figure expresses the additional amplifier noise as a ratio to the resistor-generated noise. A 6-dB Noise Figure would indicate that total noise at the amplifier would be twice the noise given in Eq. 1.

Since 6-dB is a conservative estimate for an amplifier Noise Figure, the worst-case noise can be computed to be around 60 $nV_{RMS}$, in the particular example above. Multiplying this number by a factor of 10 to produce a Signal-to-Noise Ratio (SNR) that produces a good Bit Error Rate (BER), the minimum auxiliary signal peak-to-peak voltage would be approximately 600 $nV_{peak-to-peak}$. Thus, upping this health information modulation depth to as high as 10 μV still results in a miniscule signal compared to the main communications channel amplitude of approximately 1 $V_{peak-to-peak}$.

In any event, Equation 1 above confirms that the noise on the auxiliary channel is sufficiently low that the channel may be used with peak-to-peak voltage values orders of magnitude lower than that of the main data signal.

Figure 4B:
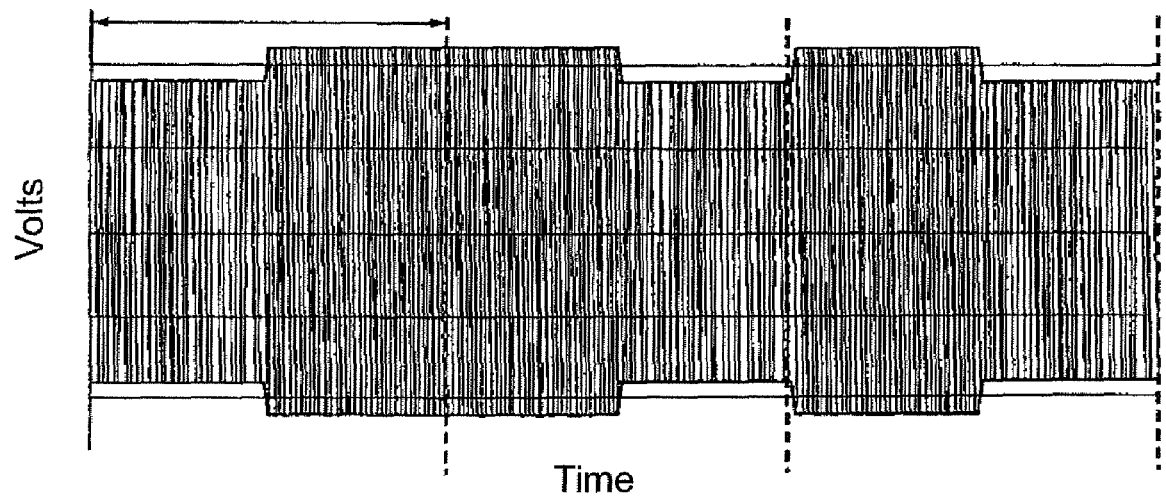

To communicate both the auxiliary signal 406 and the main data signal 400, the latter may be modulated with the low frequency envelope of the former to produce the combined signal shown in FIG. 4B. In the illustrated example, the auxiliary data signal is represented by Manchester health bits modulating the main data signal, as may be achieved via the combiner device 114 of FIG. 1.

Figure 5A:
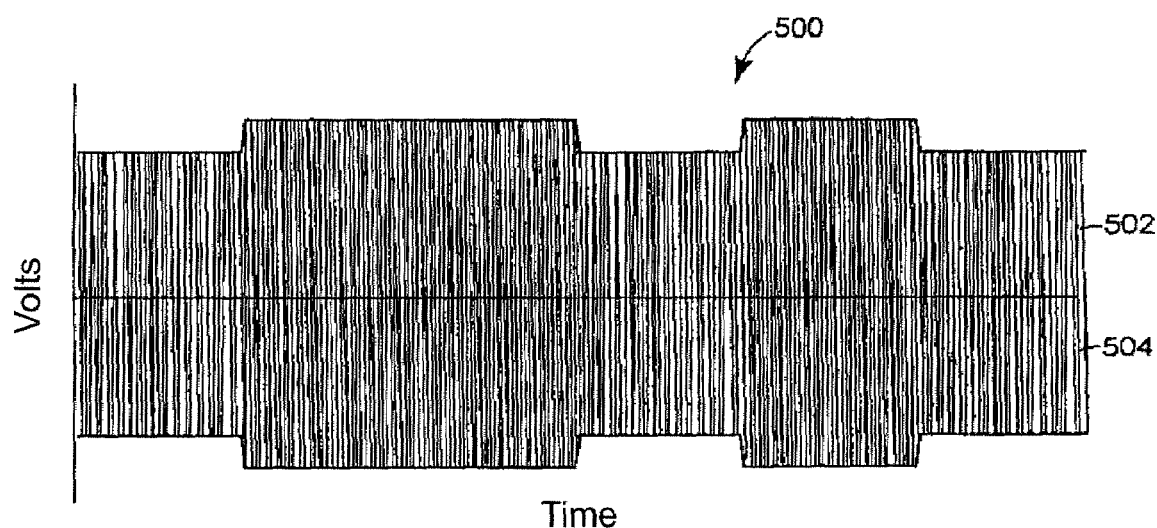
FIGS. 5A-5C illustrate the modulated high-speed data signal of FIG. 4B, a rectification of an auxiliary data signal from that modulated high-speed data signal, and a low band pass filtered version of that rectified signal, respectively, the latter of which illustrates a high signal-to-noise, low frequency auxiliary data signal having been effectively removed from the modulated high-speed data signal.
Figure 5B:
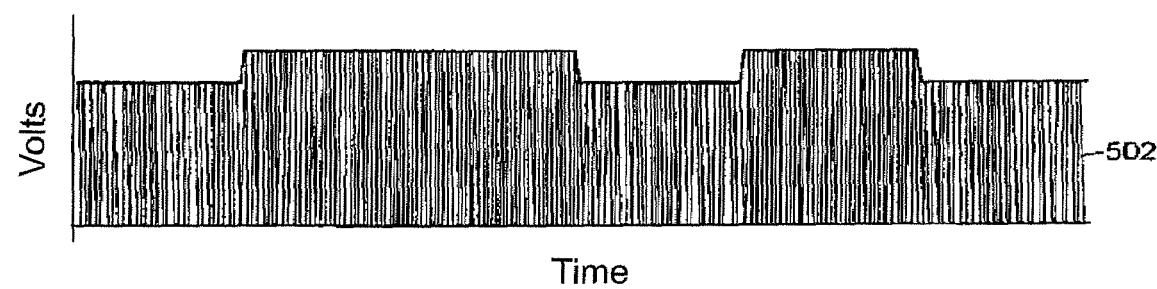
Figure 5C:
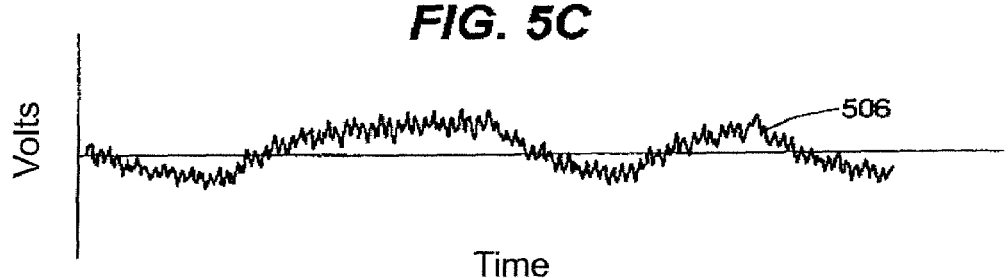

FIGS. 5A-5C illustrate an example technique for removing the auxiliary signal from a modulated high-speed data signal 500 comprising a high voltage portion 502 and a low voltage portion 504. FIG. 5A illustrates the modulated high-speed data signal as depicted in FIG. 4B. FIG. 5B illustrates a rectified waveform version after the modulated high-speed data signal has been rectified to remove the low voltage portion 504. As depicted in FIG. 5B, although the modulated data signal has been rectified, there are still high frequency components in the waveform, in particular the high frequency components of the high-speed data portion of the signal. It is also apparent that the rectified signal has a rather large signal-to-noise ratio for the auxiliary signals due to the larger voltage values on high-speed data signal. FIG. 5C (signal 506) represents the rectified data signal of FIG. 5B, after passing through a low pass filter, such as the filter 126 in FIG. 2. As shown, the rectified, filter signal of FIG. 5C contains the original modulated auxiliary information for analysis.

The auxiliary signal may contain information useful for assessing the health of a network, such as the built-in test information described above. In some examples, the auxiliary signal may be used as part of a time-domain reflectometry (TDR) system capable of determining where in an electrical network fault conditions are occurring by measuring reflections on a transmission line.

FIG. 6 illustrates portions of an example network transceiver 600 that in a first mode is capable of performing a TDR built-in test for signal loss on a network having a transmission line 602, and in a second mode is capable of sending main data, e.g., high-speed data, modulated with an auxiliary, low speed envelope, which may or may not contain that obtained TDR data. The transceiver includes a microprocessor 603 and RAM 604 operatively coupled to a bus 605 and to a built-in test stage 606 and an output stage 608. The stage 606 contains a variable delay device 610 for controlling the production of TDR pulse signals to be transmitted during the built-in test mode. The variably delay device 610 may comprise a bit counter and digital comparator similar to the variable delay assembly described in U.S. Publication No. 2005/0110979, entitled "Optical Time Domain Reflectometer and Method Using the Same," incorporated herein by reference. In the illustrated example of FIG. 6, the delay device 610 is coupled to and drives a signal source 612 of the stage 606, which produces the TDR pulses. In the illustrated example, the signal source 612 is coupled to a switch 613 whose state is controlled by the microprocessor 603 for selectively transmitting the TDR pulses or main data from stage 608 depending on the operation mode for the device 600. During a built-in test mode, the switch 613 passes the TDR pulses from the signal source 612, for example. The output from the switch 613 is coupled to a splitter stage 614 operative for transmitting the signal from the splitter 613 onto the line 602 and for receiving and isolating reflected signals from the line 602, such as reflected pulses.

Under TDR built-in test mode, the signal source 612 produces very narrow pulses (for example, on the order of 1 ns—nanosecond), which, for example, may be spaced apart by a repetition rate (frequency) on the order of the round trip time between known network devices, for example, the nearest network device coupled to the line 602. Both the pulse width and the repetition rate of the TDR pulses may be determined by the variable delay circuit 610 under controller of the microprocessor 603. As the narrow pulses travel down line 602, in addition to line loss attenuation, a portion of those pulses will be reflected back toward the transceiver 600 by impedance discontinuities in the network, which results in less signal being transmitted to the load (e.g., remote device 625). These reflections are often triggered by the presence of a network device, but also will occur due to faults in the transmission line 602 itself.

In the built-in test mode, the stage 606 is capable of receiving these reflected signals to the splitter 614 which couples them to a sample and hold circuit 616. The variable delay device 610 is coupled to the sample and hold device 616 in the illustrated example and communicates timing information to the device 616, such as the time elapsed between TDR pulses or the time between a TDR pulse and a received reflected pulse. Preferably, the sample and hold device 616 has a capture time of one 1 ns or less for resolving the reflected signals, which would have pulse widths on the order of or longer than the original TDR pulses. In the illustrated example, the device 616 samples and holds data collected for the reflected signals and provides that data to an analog to digital converter 618 for communication to the microprocessor 603.

In this way, the device 616 may be synchronized with the timing of the TDR pulses for accurate assessment of the location and thus the source of the reflected signals. Based on the timing of the reflected signal, the timing of the original TDR pulses, and the time delay therebetween, the microprocessor 603 may determine the physical position of a fault 623 on the line 602 as well as that of the remote device 625, both of which could produce line reflections to the device in some examples. Using known techniques, the microprocessor 603 may differentiate between the different reflections, those due to network devices or connectors and those due to faults in the line. Correspondingly, that information may be stored at the computer-readable storage 620 and/or provided to an output device or controller via interface 622.

In some examples, by using a low-frequency, or low-repetition rate, TDR signal, the system 600 may be able to withstand large signal losses, e.g., 20 dB or more, and still provide adequate identification of the source of the signal loss. By way of example, not limitation, a system having a 50 ft cable, and a 100 ns pulse round trip time, may have an initial variable delay set to 0.5 ns. A TDR pulse would be sent, a reflection sampled at the 0.5 ns delay, and the result stored. The variable delay could then be set to 1 ns, a pulse sent, and a sample made after the 1 ns delay. This continual sampling and holding could be made with incremental 0.5 ns changes to the variable delay, until the sampling stores a signal above a threshold power. Eventually, a reflected signal will be received and the corresponding delay recorded and associated with a physical length along the line. For example, a signal received from a 22 ns delay may correspond to a reflection originating from a point 11 ft down the line. Of course, it will be understood that this is just an example. It will also be understood that different TDR computational techniques may be used for the built-in testing.

Once the TDR information has been obtained, that data may be communicated to an auxiliary data source 624 also coupled to the bus 605. The source 624 may use this TDR data as auxiliary built-in test data that is combined, in a modulating manner, with the main data signals from a source 626 and via a combining circuit 628, as described above. The output from the circuit 628 (e.g., a signal like that illustrated in FIG. 4B) is provided to the switch 613 for communicating to the splitter 614 when the device 600 is in a second, or main signaling mode. That is the TDR operation occurs separately from main data signal operation.

While FIG. 6 shows an example implementation of a built-in testing on an electrical network, persons of ordinary skill in the art will appreciate that the techniques described herein may be used in other configurations and in other applications beyond TDR.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. An apparatus for providing auxiliary channel communication on an electrical signal-based network, the apparatus comprising:

an electrical signal source adapted to provide a high-speed data signal extending over a high frequency range and having a first maximum peak-to-peak value, the signal source adapted to provide an auxiliary data signal extending over a low frequency range below the high frequency range and having a second maximum peak-to-peak value smaller than the first maximum peak-to-peak value, wherein the second maximum peak-to-peak value is at least two orders of magnitude smaller than the first maximum peak-to-peak value, the second maximum peak-to-peak value is larger than at least twice a RMS noise voltage, $v_n$, wherein $v_n$ is expressed by $$v_n = \sqrt{4kTBR}$$

wherein k is Avogadro's number, T is temperature in K, and B is the bandwidth of the low frequency range; and
a controller coupled to the signal source for controlling the signal source to produce the high-speed data signal and for modulating the high-speed data signal with the auxiliary data signal.

2. The apparatus of claim 1, wherein the high frequency range of the high-speed data signal extends from a frequency of at least 10 MHz or higher, and wherein the low frequency range of the auxiliary signal is below 10 MHz.

3. The apparatus of claim 2, wherein the low frequency range is at least 1 kHz or below.

4. The apparatus of claim 1, wherein the high frequency range of the high-speed data signal has a low cut-off frequency, and wherein the low frequency range of the auxiliary data signal has a high cut-off frequency that is at least two orders of magnitude lower than the low cut-off frequency.

5. The apparatus of claim 1, wherein the auxiliary data signal has an upper voltage portion and a lower voltage portion, the apparatus further comprising a receiver comprising:
a rectifying circuit for removing the lower voltage portion from the auxiliary data signal and producing a rectified auxiliary data signal;
a filtering circuit coupled to the rectifying circuit for filtering the high speed data signal from the rectified auxiliary data signal; and
a second controller for assessing the filtered, rectified auxiliary data signal.

6. The apparatus of claim 5, wherein the rectifying circuit comprises a rectifying diode, and wherein the filtering circuit is a low-noise amplifier circuit.

7. The apparatus of claim 1, wherein the auxiliary data signal includes health information for the electrical signal-based network.

8. The apparatus of claim 7, wherein the auxiliary data signal includes data for a transmitted power level of the electrical network.

9. The apparatus of claim 1, wherein the high-speed data signal and the auxiliary data signal are Manchester modulated data signals.

10. An apparatus for testing an electrical signal-based network capable of transmitting a high-speed data signal extending over a high frequency range and having a first maximum peak-to-peak value, the apparatus comprising:
a transmitter having a signal source adapted to modulate the high-speed data signal with an auxiliary data signal extending over a low frequency range below the high frequency range and having a second maximum peak-to-peak value, wherein the second maximum peak-to-peak value is at least two orders of magnitude smaller than the first maximum peak-to-peak value, the second maximum peak-to-peak value is larger than at least twice a RMS noise voltage, $v_n$, wherein $v_n$ is expressed by $$v_n = \sqrt{4kTBR}$$

wherein k is Avogadro's number, T is temperature in K, and B is the bandwidth of the low frequency range, the auxiliary data signal comprising operational data of the transmitter; and
an analyzing circuit coupled to receive the modulated high-speed data signal from the signal source and adapted to separately analyze the auxiliary data signal from the modulated high-speed data signal for assessing the operational data.

11. The apparatus of claim 10, wherein the high frequency range of the high-speed data signal extends from a frequency of at least 10 MHz or higher, and wherein the low frequency range of the auxiliary signal is at least 1 kHz.

12. The apparatus of claim 10, wherein the high frequency range of the high-speed data signal has a low cut-off frequency, and wherein the low frequency range of the auxiliary data signal has a high cut-off frequency that is at least two orders of magnitude lower than the low cut-off frequency.

13. The apparatus of claim 10, wherein the auxiliary data signal has an upper voltage portion and a lower voltage portion, the analyzing circuit further comprising:
a rectifying circuit for removing the lower voltage portion from the auxiliary data signal and producing a rectified auxiliary data signal; and
a filtering circuit coupled to the rectifying circuit for filtering the high speed data signal from the rectified auxiliary data signal.

14. A method for testing an electrical signal-based network capable of transmitting a high-speed data signal extending over a high frequency range and having a first maximum peak-to-peak value, the method comprising:
adapting a signal source to modulate the high-speed data signal with an auxiliary data signal extending over a low frequency range below the high frequency range and having a second maximum peak-to-peak value, wherein the second maximum peak-to-peak value is at least two orders of magnitude smaller than the first maximum peak-to-peak value, the second maximum peak-to-peak value is larger than al least twice a RMS noise voltage, $v_n$, wherein $v_n$ is expressed by $$v_n = \sqrt{4kTBR}$$

wherein k is Avogadro's number, T is temperature in K, and B is the bandwidth of the low frequency range, the auxiliary data signal comprising operational data of a transmitter; and
providing an analyzing circuit adapted to separately analyze the auxiliary data signal from the modulated high-speed data signal for assessing the operational data.

15. The method of claim 14, wherein the high frequency range of the high-speed data signal extends from a frequency of at least 10 MHz or higher, and wherein the low frequency range of the auxiliary signal is at least 1 kHz.

16. The method of claim 14, wherein the high frequency range of the high-speed data signal has a low cut-off frequency, and wherein the low frequency range of the auxiliary data signal has a high cut-off frequency that is at least two orders of magnitude lower than the low cut-off frequency.

17. The method of claim 14, wherein the auxiliary data signal has an upper voltage portion and a lower voltage portion, the method further comprising:
providing a rectifying circuit for removing the lower voltage portion from the auxiliary data signal and producing a rectified auxiliary data signal; and
providing a filtering circuit coupled to the rectifying circuit for filtering the high speed data signal from the rectified auxiliary data signal.

* * * * *

UNITED STATES PATENT AND TRADEMARK OFFICE
CERTIFICATE OF CORRECTION

| | | |
|---|---|---|
| PATENT NO. | : 7,639,001 B2 | Page 1 of 1 |
| APPLICATION NO. | : 11/332979 | |
| DATED | : December 29, 2009 | |
| INVENTOR(S) | : Daniel N. Harres | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1018 days.

Signed and Sealed this

Ninth Day of November, 2010

David J. Kappos
*Director of the United States Patent and Trademark Office*